Patented Nov. 1, 1932

1,886,351

UNITED STATES PATENT OFFICE

EDWARD ARTHUR MURPHY, OF WYLDE GREEN, ROBERT GILBERT JAMES, OF BIRMINGHAM, AND DOUGLAS FRANK TWISS, OF WYLDE GREEN, ENGLAND, ASSIGNORS TO DUNLOP RUBBER COMPANY LIMITED, OF BIRMINGHAM, ENGLAND, A CORPORATION OF GREAT BRITAIN

MANUFACTURE OF RUBBER ARTICLES

No Drawing. Application filed September 17, 1929, Serial No. 393,309, and in Great Britain October 6, 1928.

This invention is concerned with improvements in the manufacture of rubber articles and has for its object the formation of wrinkling or corrugated or grained effects on the surfaces of uncoagulated layers of rubber or similar vegetable resins obtained as by dipping and/or spreading and/or spraying from aqueous dispersions of organic materials of the kinds hereinafter referred to. This is effected by bringing the uncoagulated layers obtained according to any one or more of these means into contact with single or mixed liquids which are capable of effecting coagulation and swelling concurrently or into contact with two liquids one of which effects coagulation and the other swelling.

The dispersions of organic materials may be of rubber or similar vegetable resins and may be either non-concentrated or concentrated, compounded, preserved, natural or artificial, vulcanized or unvulcanized, and such dispersions may also contain such added substances as factice, rubber waster, rubber reclaim, mineral rubber, or synthetic rubber, vulcanizing agents, accelerators, additional preservatives, dyes and filling materials of the ordinary type as well as such special materials as leather dust, cork dust, fibres, metal dust and colloidal metals. Such dispersions may also have admixed therein such artificial resins as phenol-aldehyde, protein-aldehyde and/or urea-aldehyde condensation products. All such materials whether of natural or artificial origin, are designated generically herein as rubber materials.

An embodiment of the invention is as follows:—A non-porous shape or former is dipped into a latex having a water content of 25% to 30% and a solid content of the following composition:—

| | | |
|---|---|---|
| Rubber as latex | 55.0 | —expressed as dry rubber |
| Sulphur | 2.0 | |
| Accelerator | 0.4 | |
| Whiting | 20.6 | —expressed as dry rubber |
| Zinc oxide | 3.0 | |
| Barytes | 20.6 | |
| Transformer oil | 5.0 | |
| Colour | 1.0 | |
| | 100.0 | |

The shape with the uncoagulated deposit of concentrated latex is then dipped into a solution consisting of five parts of glacial acetic acid and 200 parts of benzene (by volume) for a short time, e. g. a few minutes, when it is found that wrinkling of the surface of the deposit is obtained. The wrinkling effect is probably due to the swelling effect of the benzene on the coagulated surface skin formed in the first place by the acetic acid. The under-layer must coagulate more slowly otherwise no wrinkling effect would be obtained, as in order to produce the wrinkling effect the skin has to crinkle up.

It has been found that by adjusting the proportion of the coagulant and by the presence of a diluent such as alcohol the degree of depth of wrinkling can be controlled. For example, a mixture consisting of glacial acetic acid 2.5 parts, benzene 200 parts, alcohol 200 parts, will give only a slight wrinkling effect.

It has also been found that the wrinkling effect can be obtained by first dipping the uncoagulated deposit into a coagulating bath consisting for example of alcohol or a 0.5% acetic acid solution in water or an aqueous solution of an aluminium salt, (e. g. 5% solution) for a few seconds and then dipping the thus treated deposit into a swelling bath, as for example a mixture of one containing equal parts of benzene and alcohol.

The uncoagulated layer which is to be supplied with the wrinkled or corrugated surface may itself constitute the final article, or the uncoagulated layer may be in the first place formed on a surface such as of vulcanized or unvulcanized rubber or metal.

The subsequent setting of the layer after the formation of the wrinkling thereon can be effected by merely drying, with or without heating, or by the setting effect of heat or by the immersion of the deposit in a dehydrating and setting solution, a suitable solution for dehydrating is as follows:—An ammonium acetate solution of 70% concentration at 90° C. or a saturated brine solution at 90° C.

Alternatively, the wrinkling and setting of the layer may be carried out concurrently by the use of a solution containing dehydrating and swelling agents. An example of such a mixture is benzene approximately 100 parts, alcohol approximately 100 parts, ammonium acetate approximately 15 parts, water approximately 7 parts.

If desired, the wrinkled or corrugated surfaces obtained according to any of the modifications described above can be treated as by painting with a varnish or very thin latex of a different colour and in this manner a material can be obtained of a grained leather-like appearance.

In another form of the invention the liquid effecting surface coagulation and wrinkling may consist of a single substance such as carbon tetrachloride or butyl acetate. Moreover a mixture of such two liquids may also be employed. If an uncoagulated layer of concentrated compounded latex is dipped into either of these liquids or mixture of liquids for a short time a corrugated surface is produced. If acetic acid is added to either of these liquids the wrinkling effect is still more marked.

Different degrees of the corrugated surface may also be obtained by suitable choice of the swelling agent to which the coagulant (which may be any acidic substance, e. g. acetic acid or propionic acid, soluble to a sufficient degree in the swelling agent and also in water) is added.

Suitable swelling agents include the known solvents for rubber, e. g. benzene and toluene, xylene and other coal-tar distillates, petroleum distillates, carbon disulphide or chloro-substitution products of ethane, ethylene or methane, or again, ether, or volatile hydrocarbon liquids generally, or mixtures of any of the foregoing.

It is possible to apply the treatment to layers of concentrated compounded latex to yield on subsequent vulcanization, either soft or hard rubber products. Metal articles coated with a layer of vulcanite showing an attractive leather-like grained surface may, for example, be obtained in this manner.

We have found that uncoagulated products obtained from compounded concentrates prepared from rubber latex wherein compounding ingredients are intimately mixed with the latex in the presence of one or more stabilizers, as for example a colloid such as glue, gelatine, casein or soap, and the mixtures concentrated by evaporation while being subjected to gentle continuous dispersive agitation are particularly suitable for the purpose of this invention.

While we have given various specific examples of materials used in carrying out our process and have described the process with great particularity it is to be understood that the description is to be interpreted in an illustrative rather than a limiting sense, since various modifications may be made without departing from the invention as defined in the appended claims.

What we claim is:—

1. A process for the manufacture of rubber articles which comprises contacting uncoagulated layers of an aqueous dispersion of rubber with a bath containing coagulating and swelling material.

2. A process as defined in claim 1 wherein a bath consisting of glacial acetic acid and benzene is employed to effect the coagulation and wrinkling of the surface of the deposit.

3. A process as defined in claim 1 wherein a bath consisting of glacial acetic acid and benezene is employed to effect the coagulation and wrinkling of the surface of the deposit and wherein a diluent such as alcohol is added to the bath.

4. A process for the manufacture of rubber articles which comprises forming an aqueous dispersion of rubber on a foundation of rubber and wherein such dispersion is coagulated and wrinkled by treatment in a bath containing a coagulating and swelling agent.

5. A process as defined in claim 1, wherein the mixture employed is benzene approximately 100 parts, alcohol approximately 100 parts, ammonium acetate approximately 15 parts, and water approximately 7 parts.

6. A process as defined in claim 1 wherein the wrinkled layers are subsequently vulcanized.

7. A process for the manufacture of rubber from aqueous dispersions thereof, which comprises concurrently coagulating and swelling a layer of aqueous dispersion of rubber by immersing said layer in immediate succession in coagulating and in swelling media.

8. The process of claim 7 in which the swelling medium comprises benzene and alcohol.

In witness whereof, we have hereunto signed our names.

EDWARD ARTHUR MURPHY.
ROBERT GILBERT JAMES.
DOUGLAS FRANK TWISS.